United States Patent

[11] 3,525,327

[72] Inventor Joseph C. Crudden
 Dallas, Texas
[21] Appl. No. 745,281
[22] Filed July 16, 1968
[45] Patented Aug. 25, 1970
[73] Assignee Forney Engineering Company
 Dallas, Texas
 a corporation of Texas

[54] DAMPER BLADE FOR HIGH DIFFERENTIAL TEMPERATURE SERVICE
 2 Claims, 3 Drawing Figs.
[52] U.S. Cl. .................................................. 126/285, 137/601
[51] Int. Cl. .................................................. F23l 13/08
[50] Field of Search .......................................... 126/285; 98/110; 137/339, 601; 251/306, 308

[56] References Cited
UNITED STATES PATENTS
2,718,885 9/1955 Ericson ........................ 126/285

Primary Examiner— Charles J. Myhre
Attorney—Constantine A. Michalos, John Maier III and Marvin A. Naigur ABSTRACT: A high temperature damper construction for regulating the flow of hot gases through a duct opening which is exposed to exterior ambient conditions at a temperature substantially lower than the temperature of the hot gases within the duct. The damper construction includes an exterior blade which is exposed to the outer ambient conditions and an interior blade which is exposed to the hot gases. The interior blade is formed with openings and is spaced apart from the exterior blade to form an internal chamber for receiving the flow of hot gases.

Patented Aug. 25, 1970
3,525,327
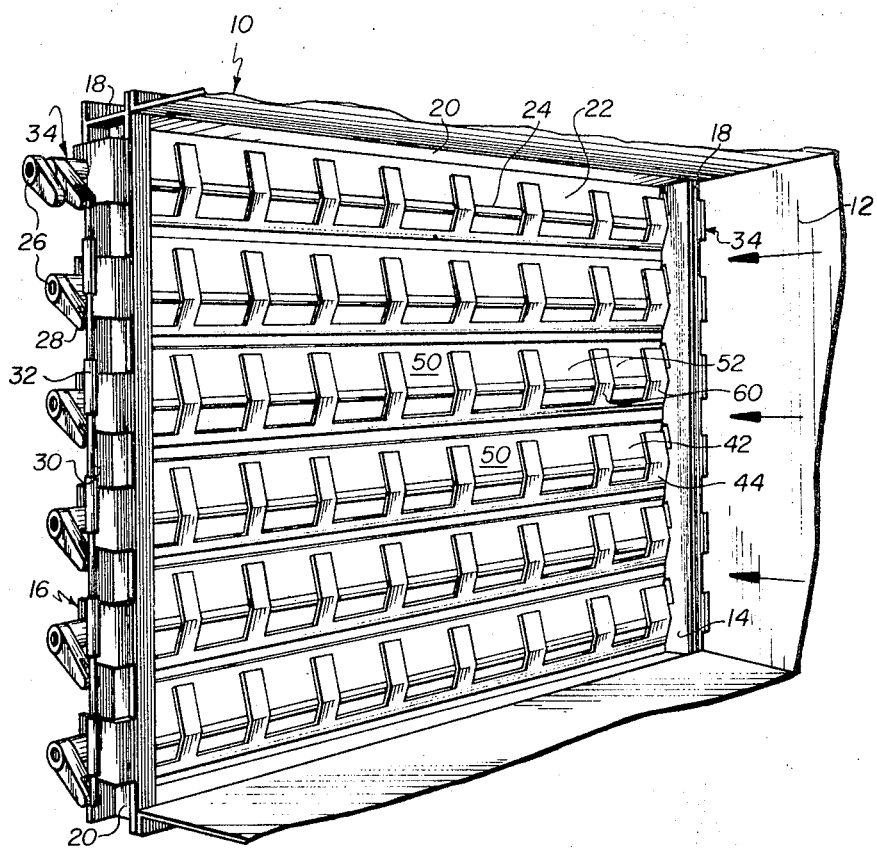
FIG.1
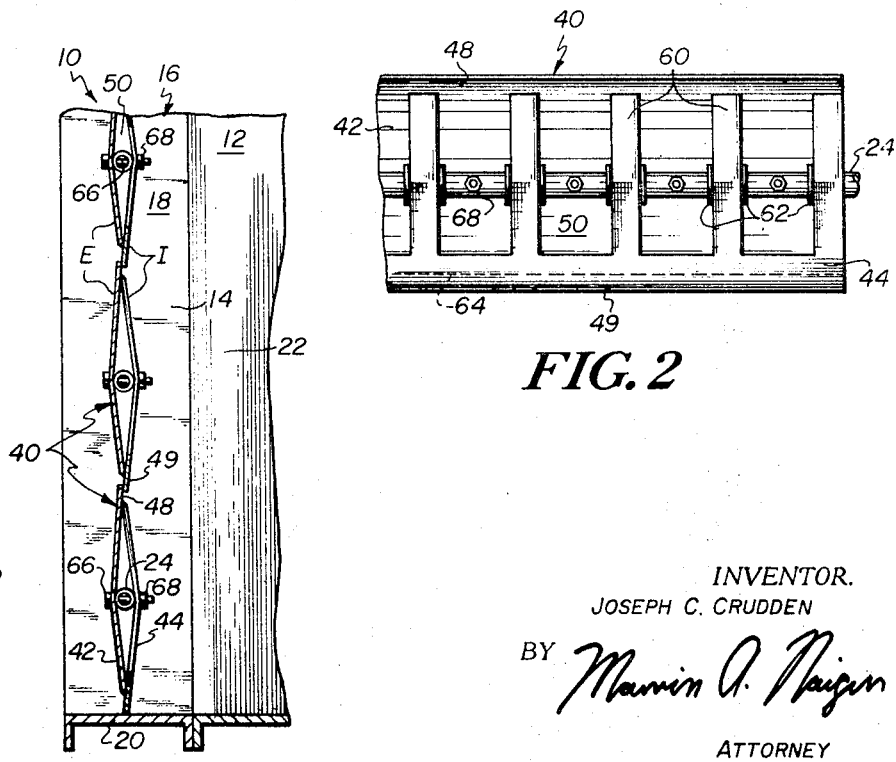
FIG.2
FIG.3
INVENTOR.
JOSEPH C. CRUDDEN
BY *Marvin A. Naigur*
ATTORNEY 3,525,327

DAMPER BLADE FOR HIGH DIFFERENTIAL TEMPERATURE SERVICE

BACKGROUND OF THE INVENTION

In many gas turbine and boiler installations, high temperature precision dampers are used to regulate the flow of hot gases. One of the most widely used damper constructions consists of a series of damper blades, each of which is individually mounted on a shaft, such that the blades can form a gas barrier across a duct opening when in a closed position. The damper blades are generally formed with an outer skin and a spaced apart inner skin which are welded along the opposite longitudinal portions of the shaft and also along the outer longitudinal edges of the blades. Thus, an aerodynamic or air foil shape blade arrangement is provided which can be positioned side by side in a duct opening to form a barrier to the hot gases when in a closed position. The blades can also be adjusted into various intermediate positions to regulate the flow of hot gases through the duct. With an aerodynamic type of blade construction it is possible to provide a design which has low gas leakage and also to determine a precise gas flow rate for a given damper angular opening.

When providing a damper construction for use between two different ambient conditions, it has been found that a large temperature variance occurs across the blades. This is particularly prevalent when one side of the damper is exposed to ambient air and the other side to hot gases which are being blocked off within the duct, and there is a particularly marked difference in temperatures across the blades when forced circulation of gases is present on one or both sides of the duct. In blades of conventional design, provided with a skin covered configuration which is substantially identical on both sides of the duct, the temperature difference or gradient between the inner and outer blades causes distortion to the blades, thereby leading to excessive gas leakage in a closed position and also causing the damper to bind when being rotated to the various intermediate opened positions.

To prevent distortion to damper blades caused by the large temperature gradient between the inner and outer damper blades, the inner blade half which is exposed to higher gas temperatures has been formed with a series of slotted openings. In this manner the hot gases will pass through an internal blade chamber which is formed between the inner blade half and the outer blade half, and the temperature gradient between the blade halves is substantially decreased.

SUMMARY OF THE INVENTION

In accordance with an illustrative embodiment demonstrating features and advantages of the present invention, there is provided a high temperature damper construction for regulating the flow of hot gases through a duct having an opening exposed to exterior ambient conditions in which the temperature is substantially lower than the temperature of the hot gases. A horizontal shaft is mounted across the duct opening and bearing means are positioned on the duct on opposite sides of the opening for rotatably mounting the shaft. An exterior blade half is fixed to the shaft in order to confront the exterior side of the opening, and the exterior blade half is bordered by marginal edges which are sized in accordance with the configuration of the opening. An interior blade half is integrally formed with the exterior blade half and is positioned to confront the interior side of the duct opening. The interior blade half is formed with a series of blade openings which are spaced apart from the exterior blade half such that an interior blade chamber is formed for receiving the flow of hot gases through the blade openings. Thus, the temperature gradient between the interior blade half and the exterior blade half is substantially decreased.

BRIEF DESCRIPTION OF THE DRAWINGS

The above brief description as well as further objects, features, and advantages of the present invention will be more fully appreciated by reference to the following detailed description of a presently preferred but nonetheless illustrative embodiment in accordance with the present invention when taken in connection with the accompanying drawings wherein:

FIG. 1 is a perspective view of a high temperature damper construction of the instant invention which is shown completely removed from the duct arrangement;

FIG. 2 is an enlarged elevation view of a portion of a damper blade which is shown separated from the frame in order to illustrate the slotted interior blade half; and FIG. 3 is an enlarged sectional view showing the damper frame mounted on a duct arrangement with the upper portion being broken away.

DESCRIPTION OF THE PREFERRED EMBODIMENT

With reference to FIG. 1, in accordance with the present invention there is provided a high temperature damper construction generally designated by the reference numeral 10. By referring to FIG. 3, it can be seen that a hot gas duct arrangement 12 has been provided for mounting the damper unit 10, such that the exterior blade surface designated E confronts the ambient air, and the interior blade surface, designated I, confronts the hot air duct 12. The hot gas duct has an opening 14 for the flow of hot gases shown by the directional arrows, which flow toward the interior blade surface I. It should be understood that the instant invention is equally applicable to the single duct arrangement of FIG. 3 and a double duct arrangement, which has not been shown in the drawings. In the double duct arrangement the damper unit 10 would be mounted between two ducts such that forced circulation of gases could be provided on either side or both sides of damper unit 10. The problem of blade distortion is particularly prevalent when forced circulation is provided on both sides of damper units 10, and a very large temperature gradient can exist between the blade surfaces.

The damper unit 10 is formed with a generally rectangular frame 16 which includes a pair of upstanding vertical supports 18 that are joined together by a pair of horizontal bars 20. The inner edges of the vertical supports 18 and horizontal bars 20 define a damper zone 22 which is sized in accordance with the shape of the exit opening 14 in hot gas duct 12.

Mounted across damper zone 22 are horizontal shafts 24 which are connected together for conjoint movement by a coupling 26. Each shaft 24 is provided with a link arm 28, and a rod 30 is connected to each link arm 28. By mounting ferrule bearings 32 adjacent the shafts 24, it is possible to move rod 30 for actuating link arm 28 which rotates each of the respective shafts 24. Bearing means 34 are mounted on opposite sides of the vertical supports 18 to accommodate the rotation of shafts 24.

A damper blade 40 is mounted on each shaft 24, such that rotation of shaft 24 causes the damper blades 40 to open and close the damper zone 22 to the flow of hot gases. Each of the damper blades 40 includes an exterior blade half 42 and an interior blade half 44. Each exterior blade half 42 is welded to an interior blade half 44. The blade halves 42 and 44 are substantially the same size and are staggered when assembled, such that a lateral overlapping marginal lip 48 is formed on exterior blade half 42 and a lateral overlapping marginal lip 49 is formed on interior blade half 44.

It should be noted that the blade halves 42 and 44 have an air foil shape, and the damper blades 40 are formed with a convex cross-sectional configuration. In this manner, each of the damper blades 40 are formed with an internal chamber 50. The interior blade halves 44 are provided with slotted openings 52, such that the hot air flows through the internal chambers 50. In accordance with the present invention, the hot air swirls in and out of internal chamber 50 through slotted opening 52, whereby there is substantially no temperature differential between exterior blade halves 42 and interior blade halves 44.

The slotted openings 52 are sized sufficiently large enough to keep both sides of shaft 24 at substantially the same temperature. By providing material, for blade halves 42 and 44, of relatively thin cross-sectional thickness, it is possible to prevent distortion due to the temperature gradient occurring between the inner and outer surfaces of exterior blade half 42.

By referring to FIG. 2, it can be seen that interior blade halves 44 include vertical arms 60 which are spaced-apart to form the slotted openings 52. The vertical arms 60 are not in any way welded to shaft 24, and pairs of bearing shoulders 62 are mounted on shaft 24 on opposite sides of vertical arms 60 to account for thermal expansion. The blade halves 42 and 44 are welded together by means of lateral welds along the edge of exterior blade half 44, which are designated by broken line 64. A series of hexagonal screws 66 and hexagonal nut 68 between shaft 24 and exterior blade half 42 serve as the means for mounting the damper blades 40 to shafts 24. Thus, the hexagonal screws 66 are inserted through exterior blade half 42 and shaft 24 and fastened by means of hexagonal nuts 68 which are provided in each of the slotted openings 52, with the nuts 68 bearing against shaft 24.

From the foregoing it can be appreciated that hot gases can be passed through the duct arrangement 12 in direct contact with interior blade halves 44. The hot gases pass into internal chamber 50, such that there is substantially uniform temperature gradient between each of the interior blade halves 44 and their respective exterior blade halves 42. In this manner, distortion to the damper blades 40 is alleviated.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A high-temperature damper unit having an interior surface, exposed to the flow of hot gases through a duct having an opening, and an exterior surface, exposed to ambient conditions in which the temperature is substantially lower than the temperature of said hot gases, comprising a horizontal shaft mounted across said opening, bearing means on said duct positioned on opposite sides of said opening for rotatably mounting said shaft, an exterior blade half fixed to said shaft in order to confront the exterior side of said opening, said exterior blade half bordered by marginal edges which are sized in accordance with the configuration of said opening, an interior blade half joined to said exterior blade half and positioned to confront the interior side of said opening, said interior blade half being formed with a series of blade openings and spaced apart from said exterior blade half such that an internal blade channel is formed for receiving the flow of hot gases through said blade openings, the marginal edge of said exterior blade half and the marginal edge of said interior blade half being welded together, said blade openings vertically positioned with respect to the longitudinal axis of said shaft and formed with a slotted configuration, vertical arms formed on said interior blade half on opposite sides of said slotted openings and bearing shoulders mounted on said shaft, said bearing shoulders positioned in said slotted openings on opposite sides of said vertical arms, whereby there is a substantially uniform temperature gradient between the interior blade half and exterior blade half.

2. A high-temperature damper unit having an interior surface, exposed to the flow of hot gases through a duct having an opening, and an exterior surface, exposed to ambient conditions in which the temperature is substantially lower than the temperature of said hot gases, comprising a plurality of horizontal shafts mounted across said opening, bearing means on said duct positioned on opposite sides of said opening for rotatably mounting each of said shafts, a series of damper blades mounted on said shaft, said damper blades sized to block said opening when moved to a position which is substantially coextensive with said opening, said damper blades having an air foil-shaped configuration and formed with a hollow internal blade chamber, a plurality of orifices on said damper blade confronting said interior surface for receiving the flow of hot gases through said blade openings, one of the marginal edges of said damper blades being welded together, said orifices being vertically positioned. with respect to the longitudinal axis of said shaft and formed with a slotted configuration, vertical arms formed on said damper blades on opposite sides of said slotted openings and bearing shoulders mounted on said shafts, said bearing shoulders positioned in said slotted openings on opposite sides of said vertical arms, whereby there is a substantially uniform temperature gradient between the interior blade half and exterior blade half.